(12) United States Patent
Muenter

(10) Patent No.: US 7,291,832 B2
(45) Date of Patent: Nov. 6, 2007

(54) OPTICAL ENCODERS FOR POSITION MEASUREMENTS

(75) Inventor: Steven E. Muenter, Van Nuys, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/403,693

(22) Filed: Apr. 13, 2006

(65) Prior Publication Data

US 2006/0186324 A1 Aug. 24, 2006

Related U.S. Application Data

(62) Division of application No. 10/697,371, filed on Oct. 29, 2003, now Pat. No. 7,045,769.

(51) Int. Cl.
*G01D 5/36* (2006.01)
*G01J 9/00* (2006.01)
*G01C 1/06* (2006.01)

(52) U.S. Cl. ............................. 250/237 G; 250/231.17; 356/139

(58) Field of Classification Search .............................. 250/231.13–231.18, 237 G; 356/138, 139
See application file for complete search history.

(56) References Cited

U.S. PATENT DOCUMENTS 4,528,448 A * 7/1985 Doggett ................. 250/231.14
4,710,026 A * 12/1987 Magome et al. ............ 356/488
4,956,553 A * 9/1990 Matsui ................... 250/237 G
5,489,986 A 2/1996 Magome et al.
5,596,413 A * 1/1997 Stanton et al. .............. 356/401
5,654,540 A 8/1997 Stanton et al.
6,897,961 B2 5/2005 Muenter
2002/0014581 A1* 2/2002 Yamamoto et al. ..... 250/231.13

OTHER PUBLICATIONS

R.J. Tansey et al., "Interferometer Encoder Techniques", Jan. 8, 1988, pp. 1-52.
R.M. Tansey, "An Absolute Distance Interferometer Using A Dye Laser Heterodyne Interferometer And Spatial Separation Of Beams", Proceedings of SPIE—The International Society for Optical Engineering, vol. 429, Precision Surface Metrology, Aug. 23-24, 1983, pp. 43-54.

* cited by examiner

*Primary Examiner*—Thanh X. Luu
*Assistant Examiner*—Brian J Livedalen
(74) *Attorney, Agent, or Firm*—MacPherson Kwok Chen & Heid LLP; Greg J. Michelson

(57) ABSTRACT

Systems and methods are disclosed for providing position measurement information. For example, in accordance with one embodiment of the present invention, a multiple-pitch grating is disclosed which is adapted to receive one or more laser beams and provide an output laser beam encoded with position information of the grating.

20 Claims, 3 Drawing Sheets

OPTICAL ENCODERS FOR POSITION MEASUREMENTS

CROSS-REFERENCE TO RELATED APPLICATIONS

This divisional patent application claims priority to U.S. patent application Ser. No. 10/697,371, filed Oct. 29, 2003 now U.S. Pat. No. 7,045,769, which is incorporated herein by reference in its entirety.

TECHNICAL FIELD

The present invention relates generally to measuring devices and, more particularly, to optical encoders for providing position information.

BACKGROUND

Optical encoders are well known and employed for a variety of applications. For example, a high-resolution optical encoder may be utilized to measure a relative position of an object by providing a count signal and a direction signal in response to position movements of the object. To determine an absolute position of the object, the object is typically moved to a known, repeatable position referred to as the "home" position. Additional sensors and/or fixtures (e.g., hard stops or limit switches) are generally required for determining the home position.

An electronic counter of the optical encoder is typically reset to zero at the home position. The count and direction signals generated due to differential movement from this absolute home position are utilized to update the electronic counter. Consequently, by knowing the amount of movement required to generate a count signal and the count associated with the home position (e.g., a count of zero), the absolute position of the object can be determined from the present count.

One drawback of this type of optical encoder is that after the home position is determined, the integrity of the count and direction signals must be maintained. For example, a momentary power loss or signal interruption (e.g., a signal glitch) will result in invalid position information. Additionally, the object's motion (e.g., velocity) must be limited so that the rate at which the count signals are generated does not exceed the counter's capabilities. As a result, there is a need for providing improved position measurement techniques.

SUMMARY

Systems and methods are disclosed herein to provide position information for an object. For example, in accordance with an embodiment of the present invention, an optical encoder system is employed to provide relative or absolute position information for an object associated with a grating. The grating, for example, may be a multiple-pitch grating fabricated with two or more simultaneous spatial frequencies. One or more laser beams are directed to the grating, with each laser beam, for example, having a distinct spatial and temporal frequency. The resulting laser beam from the grating may be detected and decoded to determine a position of the grating.

More specifically, in accordance with one embodiment of the present invention, a measurement device includes an acousto-optic modulator adapted to receive a laser beam and modulate the laser beam based upon one or more frequencies of a received input signal to generate one or more modulated laser beams, wherein the input signal is comprised of one or more signals corresponding to one or more of the frequencies; a multiple-pitch grating adapted to receive one or more of the modulated laser beams and provide an output laser beam; a photodetector adapted to receive the output laser beam and provide an output signal; at least one filter adapted to filter the output signal at one or more of the frequencies of the input signal and provide a corresponding filtered output signal; and at least one phase detector adapted to determine a phase difference between a phase of the filtered output signal and a phase of a corresponding one of the signals of the input signal, wherein the phase difference corresponds to a position measurement of the multiple-pitch grating.

In accordance with another embodiment of the present invention, a grating includes a first pitch period providing a first spatial frequency; and at least a second pitch period providing at least a second spatial frequency, with the first pitch period orientated in a substantially same direction as the second pitch period, and wherein the grating optically encodes a laser beam having spatial frequencies corresponding approximately to the first and second spatial frequencies of the grating to provide position information of the grating.

In accordance with another embodiment of the present invention, a grating includes a first spatial frequency orientated in a first direction and having a first pitch; and at least a second spatial frequency orientated substantially in the first direction and having at least a corresponding second pitch, wherein the grating optically encodes a laser beam having spatial frequencies corresponding approximately to the first spatial frequency and the at least second spatial frequency of the grating to provide corresponding position information of the grating.

In accordance with another embodiment of the present invention, a method of obtaining position information of a grating includes receiving a laser beam; directing the laser beam to provide two or more spatial frequencies; passing the laser beams with the spatial frequencies through the grating having multiple-pitches to provide one or more output laser beams with encoded position information; and decoding the one or more output laser beams to determine a position of the grating.

In accordance with another embodiment of the present invention, a system includes a grating having two or more pitches; means for providing to the grating one or more laser beams with spatial frequencies corresponding to one or more of the pitches of the grating; and means for decoding an output laser beam resulting from the one or more laser beams passing through the grating to provide one or more output signals, wherein the one or more output signals provide position information of the grating.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
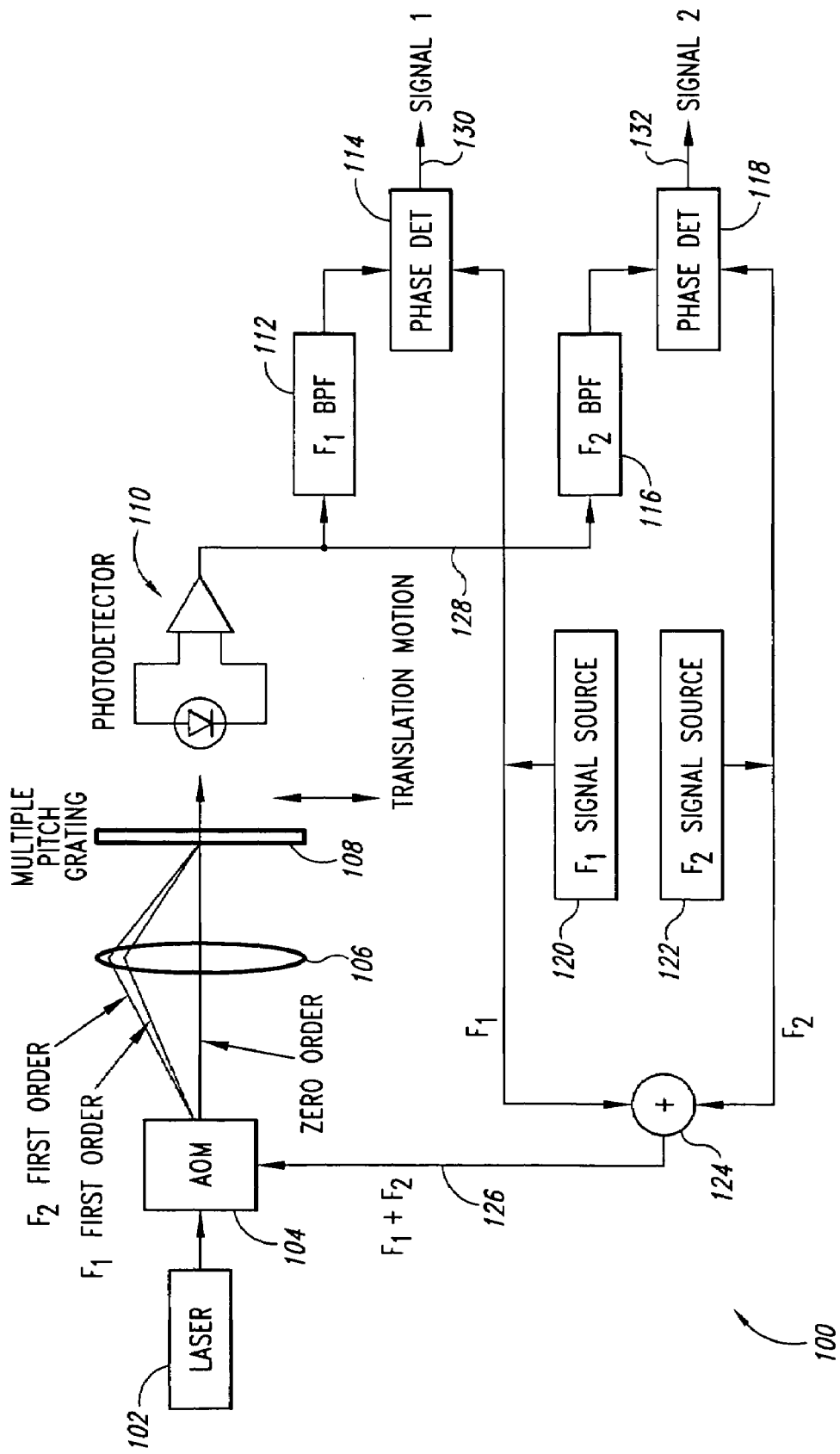
FIG. 1 shows a block diagram illustrating an optical encoder system in accordance with an embodiment of the present invention.

FIG. 1 shows a block diagram illustrating a system 100 for providing position information of an object in accordance with an embodiment of the present invention. System 100 utilizes optical encoder techniques to provide, for example, an absolute position measurement of an object.

System 100 includes a laser 102, an acousto-optic modulator (AOM) 104, a lens 106, a grating 108, a photodetector 110, filters 112 and 116, phase detectors 114 and 118, signal sources 120 and 122, and a summer 124. Laser 102 provides a laser beam to AOM 104. Summer 124 sums signals F1 and F2 provided by signal sources 120 and 122, respectively, and provides a signal 126 (labeled F1+F2) to AOM 104.

AOM 104 modulates the laser beam to provide the zero order and positive first order diffraction components (or alternatively the negative first order diffraction components) of the modulated laser beam to lens 106. Note that AOM 104 may be operated to attenuate undesired diffraction components (e.g., negative first order and higher orders) or a filter may be placed between AOM 104 and lens 106 to remove the undesired diffraction components.

Lens 106 directs the zero order (undiffracted) and first order diffraction components of the modulated laser beam to grating 108, which provides an output laser beam to photodetector 110. Photodetector 110 provides an output signal 128 (an electrical signal) based on the output laser beam. Output signal 128 is filtered by filters 112 and 116 (e.g., bandpass filters), which allow through frequencies of the signals F1 and F2, respectively.

Phase detectors 114 and 118 compare the phase of signals F1 and F2 to signals provided by filters 112 and 116, respectively, and provide corresponding signals 130 and 132 (labeled Signal 1 and Signal 2, respectively). The phase difference between signals 130 and 132 determines the absolute position of grating 108.

System 100 may be utilized, for example, as a high-resolution absolute position optical encoder to determine the absolute position of grating 108 (or the position of an object associated with grating 108). Consequently, there is no need to move the object to a home position to calibrate the system as required with some conventional position measurement devices.

System 100 may also provide certain advantages over conventional position measurement devices. For example, system 100 is not permanently affected by signal interruptions and is tolerant of high slew rates (i.e., rapid changes in position) between measurements. Consequently, power may be removed from system 100 when measurements are not required, which may provide desired power consumption savings in battery powered applications.

In accordance with an embodiment of the present invention, grating 108 may be formed as part of or attached to an object whose position is to be monitored. Grating 108, for example, may be a sinusoidally-modulated amplitude grating fabricated with one or more simultaneous spatial frequencies and employed as an optical encoding element. The pitch (or pitch cycle) of each individual spatial frequency determines an ambiguity range for that spatial frequency. Consequently, a translation of grating 108 by any integer number of grating pitch cycles is indistinguishable. To eliminate this ambiguity for absolute position measurements, the translation of grating 108 with a single spatial frequency is limited to less than one pitch period of that spatial frequency. Alternatively, system 100 may be employed to provide relative position measurements, such as movement from a selected home position.

The ambiguity range may be extended by fabricating grating 108 with multiple distinct pitch periods, with the ambiguity range determined, for example, by the least common multiple (LCM) of the pitch periods. The pitch periods of grating 108 with multiple spatial frequencies may be selected so that the ambiguity range (e.g., LCM of the pitch periods) is large enough to completely span the range of measurement interest.

As discussed herein, by utilizing AOM 104, an optical beam may be produced at an image plane with a sinusoidally-modulated spatial frequency, which will also have a temporal frequency component. Consequently, the spatial sinusoidal pattern generated will "sweep" across the beam image at the temporal frequency rate. The spatial frequency and the temporal frequency of the modulation are proportional. The temporal frequency is determined by a frequency (e.g., a radio frequency (RF) drive frequency) of a signal (e.g., signal 126) provided to AOM 104. Multiple simultaneous frequencies (e.g., RF drive frequencies) of signal 126 to AOM 104 will modulate a beam image with multiple simultaneous spatial frequencies, each at a different and unique temporal frequency.

When the modulated optical beam generated by AOM 104 is imaged through grating 108 (e.g., a sinusoidally-modulated amplitude grating), the convolution of the modulated optical beam and grating 108 intensity patterns produces a mixing of the spatial frequencies. This mixing produces the sums and differences of the spatial frequencies of the modulated optical beam and grating 108.

If the spatial frequency of the modulated optical beam matches the spatial frequency of grating 108, the resultant difference spatial frequency will be aliased down to zero hertz. However, this zero hertz spatial frequency optical beam will retain its temporal modulation. Consequently, photodetector 110 (e.g., a large area photodetector) may be used to detect the temporal modulation of the modulated optical beam with a zero hertz spatial frequency.

The physical location of grating 108 (e.g., sinusoidal amplitude grating) relative to the modulated optical beam can be determined by comparing the phase of the detected temporal signal to signal 126 (i.e., RF drive signal) provided to AOM 104. The resulting phase comparison of these electrical signals will change linearly by 360 degrees for a physical translation of grating 108 equal to one period of its spatial frequency.

By measuring the phase of each temporal frequency in the corresponding electrical signal (e.g., signal 130 or signal 132), the relative position of grating 108 (e.g., the sinusoidal amplitude grating) can be determined within the ambiguity range of each spatial period contained within grating 108. Therefore, the absolute position of grating 108 can be determined mathematically within a range equal to the LCM of the periods of each individual spatial frequency.

The general operation of system 100 may be described, in further detail and in accordance with an embodiment of the present invention, for an exemplary application having two signal sources 120 and 122 as shown in FIG. 1 to measure the absolute motion of grating 108 (e.g., translational motion in the direction indicated in FIG. 1). It should be understood, however, that the techniques described in reference to FIG. 1 may be applied to a system having one, two, three, or more signal sources to measure the desired motion (e.g., translational or rotational).

AOM 104 modulates the laser beam from laser 102, with the undiffracted zero order laser beam and the first order diffracted laser beam recombined using lens 106 to form a laser beam image with a sinusoidal sweeping fringe pattern at the image plane. The spatial frequency of the fringe pattern is determined by the frequency (e.g., RF drive frequency) of signal 126 to AOM 104 and the magnification of lens 106.

If the magnification of lens 106 is held constant, the spatial frequency is directly proportional to the frequency of signal 126. Several simultaneous drive frequencies, such as frequencies f1 and f2 associated with signals F1 and F2, respectively, of signal 126, may be provided to AOM 104 to produce simultaneous spatial frequencies (e.g., two spatial frequencies corresponding to frequencies f1 and f2) in the laser beam at the image plane.

AOM 104 introduces a frequency shift onto a first order diffracted laser beam relative to the zero order laser beam equal to the RF drive frequency of signal 126. As a result, the sinusoidal pattern at the image plane appears to translate one sine wave period at a rate equal to the RF drive frequency. Furthermore, multiple RF drive frequencies (e.g., frequencies f1 and f2) produce multiple sinusoidal patterns, each with a spatial frequency and sweep rate determined by the associated RF drive frequencies of signal 126.

Grating 108, which in this example is a multiple pitch sinusoidal amplitude grating, is placed at the image plane of lens 106 (lens system). The pitch (e.g., frequency of the line spacing on grating 108) of the spatial frequencies of grating 108 matches the spatial frequencies generated at the image plane. The optical laser beam transmitted through grating 108 can be considered to be multiplied by the spatial pattern of grating 108. This produces a convolution of the spatial frequencies.

Photodetector 110 integrates the spatial frequencies across the aperture size of the optical laser beam, which performs the function of a spatial frequency low pass filter. The convolution of spatial frequencies that alias to zero hertz produces a maximum signal at photodetector 110. The spatial frequency produced by the convolution of the sinusoidal pattern corresponding to the signal F1 and the sinusoidal pattern corresponding to the signal F2 will be non-zero, but photodetector 110 will generally be insensitive to these non-zero spatial frequencies (e.g., given that photodetector 110 has a sufficiently large aperture).

The sweeping of the sinusoidal pattern at the image plane, aliased to zero hertz by grating 108, produces a temporal modulation that can be detected by photodetector 110. The frequency of the temporal modulation is equal to the associated RF drive frequency. A physical motion of grating 108 relative to the optical laser beam will induce a phase shift on output signal 128 from photodetector 110. A physical translation of grating 108 equal to one period of the spatial frequency will produce a 360 degree phase shift of the temporal modulation signal.

Output signal 128 from photodetector 110 is passed through filters 112 and 116 (e.g., bandpass filters) tuned to each of the RF drive frequencies associated with the signal F1 and the signal F2, respectively, and therefore to each of the corresponding temporal modulation frequencies. The relative phase difference of the RF drive frequency and the temporal modulation signal from photodetector 110 can be measured. Signals 130 and 132 provide the resulting phase measurements corresponding to the two temporal frequencies (associated with the signal F1 and the signal F2, respectively). The phase difference between signals 130 and 132 determines the absolute position within the extended ambiguity range.

If a larger ambiguity range is desired, in accordance with an embodiment of the present invention, three or more RF drive signals and consequently three or more grating pitches of grating 108 may be employed by utilizing the techniques discussed herein. Thus, one or more embodiments of the present invention may provide high-resolution absolute position measurements over a large range.

Furthermore, because the optical laser beam can cover a relatively large area of grating 108 (e.g., a Ronchi ruling, such as when only a binary grating is required based upon the desired application), the position information is based on the average of the grating within the area of the optical laser beam. Consequently, small particles (e.g., dust) and scratches will not significantly degrade the operation or measurement validity as compared with some conventional measurement devices.

Figure 2:
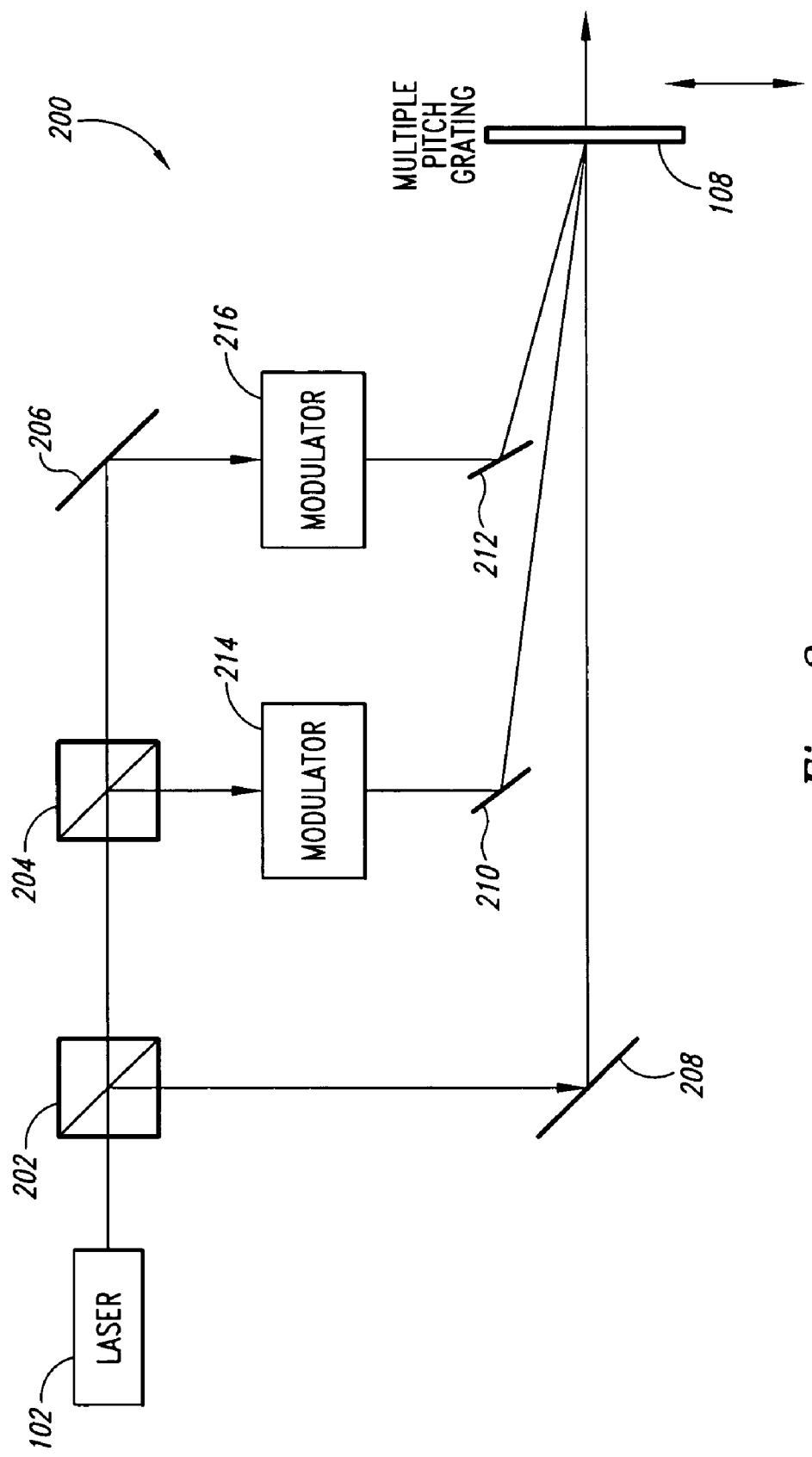
FIG. 2 shows a block diagram illustrating an optical encoder system in accordance with an embodiment of the present invention.

FIG. 2 shows a block diagram illustrating a system 200 in accordance with an embodiment of the present invention. System 200 provides position information of an object by utilizing optical encoder techniques and includes laser 102, beamsplitters 202 and 204, mirrors 206 through 212, modulators 214 and 216, and grating 108. Beamsplitter 202 and mirror 208 direct a portion of the laser beam to grating 108, while beamsplitter 204 and mirror 206 direct portions of the laser beam to modulators 214 and 216, respectively.

As can be seen from the figures, system 200 differs from system 100 (FIG. 1), for example, by using a separate modulator for each spatial frequency of the interference pattern rather than using a single AOM (i.e., AOM 104) to produce both the frequency modulation of the laser beam and the modulated interference pattern or spatial frequency. Modulators 214 and 216 may each be an AOM, a translating Ronchi ruling modulator, or a rotating radial grating modulator, for example, but are not limited to these types of modulators. Furthermore, system 200 may have one, two, three, or more modulators, depending upon the requirements and desired application.

In general, modulators 214 and 216 must each encode, modulate, or introduce a distinguishing or identifiable feature to the laser beam it provides so that the laser beam can be differentiated from a laser beam from the one or more other modulators in system 200. This allows the detector electronics (not shown) that receive the laser beam from grating 108 to be able to distinguish or separate the resulting signal to determine which modulator in system 200 produces the received laser beam or portion of the laser beam from grating 108.

For example, if modulators 214 and 216 are AOMs, their resulting signals are distinguishable by filtering at their corresponding RF drive frequency, as discussed in reference to FIG. 1 (e.g., frequency modulation of the laser beam). Alternatively, for example, modulators 214 and 216 may apply amplitude modulation as well as phase modulation to introduce a distinguishable or identifiable feature to the laser beam. Modulators 214 and 216 may also function as shutters for sequentially illuminating grating 108 with one of the laser beams at a time, thus eliminating the need for electronic bandpass filters (e.g., filters 112 and 116). In general for these examples, the spatial frequency of the interference pattern at grating 108 (multiple pitch grating) is determined by the angle at which the laser beams intersect at grating 108.

Figure 3:
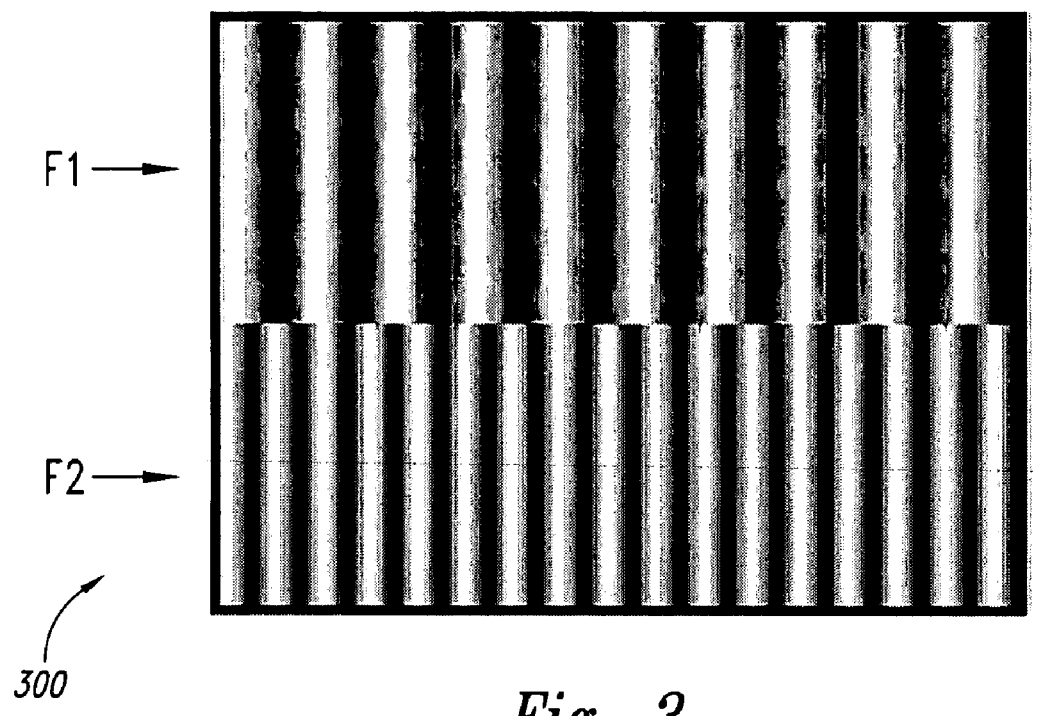
FIG. 3 shows a photograph illustrating a grating in accordance with an embodiment of the present invention.

FIG. 3 shows a photograph illustrating a grating 300 in accordance with an embodiment of the present invention. Grating 300 is an exemplary implementation of grating 108 and may be implemented, for example, in system 100 or system 200. As can be seen from the figure, the spatial frequencies corresponding to signals F1 and F2 are distinct. Thus, for this example, grating 300 represents a multiple-pitch grating using two separate gratings on one substrate. Grating 300 may be utilized, for example, by allowing the laser beam to overlap the two gratings or the laser beams may be directed directly to their corresponding gratings.

Figure 4:
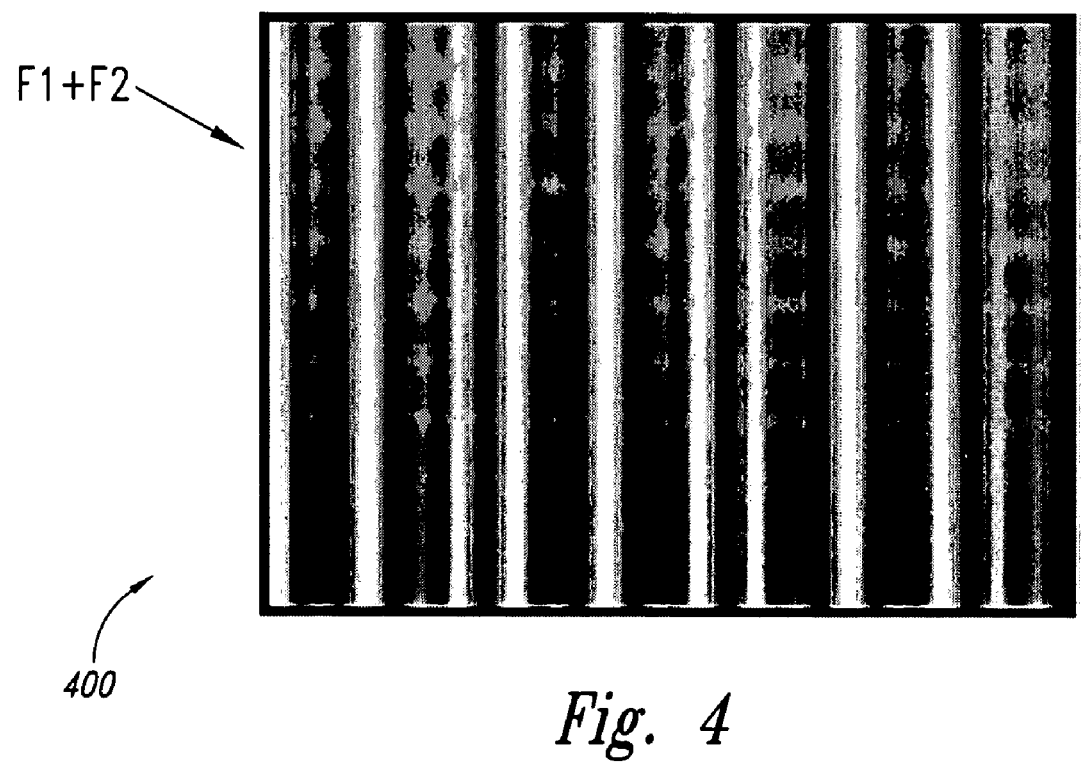
FIG. 4 shows a photograph illustrating a grating in accordance with an embodiment of the present invention.

FIG. 4 shows a photograph illustrating a grating 400 in accordance with an embodiment of the present invention. Grating 400 is another exemplary implementation of grating 108 and may also be implemented, for example, in system 100 or system 200. For this example, grating 400 combines the two exemplary spatial frequencies of grating 300. Thus, for this example, grating 400 represents a multiple-pitch grating that additively combines two separate gratings on one substrate.

In accordance with one or more embodiments of the present invention, techniques are disclosed to provide rugged and reliable position measuring systems. For example, the techniques disclosed herein may be applied to numerous applications requiring position feedback sensors, such as for rotary or linear actuators, robotic systems, avionics, and numerous other applications where position information of an object is desired. Because power to the measurement system may only be required during a position measurement (e.g., periodically or when desired upon power-up to update the absolute position measurement), the low power capability of the measurement system may be well suited for battery-powered applications or in space and satellite applications.

Embodiments described above illustrate but do not limit the invention. It should also be understood that numerous modifications and variations are possible in accordance with the principles of the present invention. Accordingly, the scope of the invention is defined only by the following claims.

I claim:

1. A grating comprising:
a first pitch period providing a first spatial frequency; and
at least a second pitch period providing at least a second spatial frequency, with the first pitch period orientated in a substantially same direction as the second pitch period, and wherein the first pitch period and the second pitch period determine an ambiguity range for the first spatial frequency and the second spatial frequency, respectively;
wherein the first pitch period and the at least second pitch period are jointly positioned on the grating such that a relative phasing of the first pitch period and the at least second pitch period on the grating optically encodes on a laser beam, illuminating a single position on the grating corresponding to an aperture of the laser beam, spatial frequencies corresponding approximately to the first and second spatial frequencies of the grating such that absolute position information of the grating can be determined based on phase information associated with the spatial frequencies.

2. The grating of claim 1, wherein the first pitch period and the at least second pitch period are all distinctly positioned separately on the grating.

3. The grating of claim 1, wherein the first pitch period and the at least second pitch period are additively combined on the grating.

4. The grating of claim 1, wherein the grating is a sinusoidally-modulated amplitude grating.

5. The grating of claim 1, wherein a least common multiple of the first pitch period and the at least second pitch period determines an ambiguity range for the absolute position information of the grating.

6. The grating of claim 1, wherein the grating comprises part of an optical encoder position measurement devide, and the grating optically encodes position information onto a laser beam passing through the grating, which can be decoded to determine the absolute position of the grating.

7. The grating of claim 1, wherein the grating forms a portion of a measurement device comprising:
means for modulating the laser beam based upon one or more frequencies of a received input signal to generate the spatial frequencies for the laser beam;
means for receiving the encoded laser beam from the grating and providing an output signal;
means for filtering the output signal to provide one or more filtered output signals; and
means for determining a phase difference between a phase of at least one of the filtered output signals and a phase of a corresponding one of the frequencies of the input signal, wherein the phase difference corresponds to a position measurement of the grating.

8. The grating of claim 7, further comprising means for directing the laser beam from the modulating means to the grating.

9. The grating of claim 8, wherein the directing means directs a zero order diffraction laser beam and at least one first order diffraction laser beam off the laser beam from the modulating means onto the grating.

10. The grating of claim 7, further comprising means for providing the laser beam to the modulating means.

11. The grating of claim 7, wherein the phase difference provides a relative position measurement of the grating, with a difference between the phase differences determined for the filtered output signals providing an absolute position measurement.

12. A grating comprising:
a first spatial frequency orientated in a first direction and having a first pitch; and
at least a second spatial frequency orientated substantially in the first direction and having at least a corresponding second pitch;
wherein the first pitch period and the at least second pitch period are jointly positioned on the grating such that a relative phasing of the first pitch period and the at least second pitch period on the grating optically encodes on a laser beam, illuminating a single position on the grating corresponding to an aperture of the laser beam, spatial frequencies corresponding approximately to the first spatial frequency and the at least second spatial frequency of the grating from which corresponding absolute position information of the grating is obtained based on phase information associated with the spatial frequencies.

13. The grating of claim 12, wherein the laser beam comprises zero and first order components.

14. The grating of claim 12, wherein the first pitch and the at least second pitch are all distinctly positioned separately on the grating.

15. The grating of claim 12, wherein the first pitch and the at least second pitch are additively combined on the grating.

16. The grating of claim 12, wherein the first spatial frequency and the at least second spatial frequency are formed in a sinusoidally-modulated fashion.

17. The grating of claim 12, wherein a least common multiple of the first pitch and the at least second pitch determines an ambiguity range for the absolute position information of the grating.

18. The grating of claim 12, wherein the grating comprises part of an optical encoder position measurement system, with the spatial frequencies of the laser beam having corresponding temporal frequencies, which can be decoded to determine the absolute position of the grating.

19. The grating of claim 12, wherein the grating forms a portion of a measurement device comprising:

means for modulating the laser beam based upon one or more frequencies of a received input signal to generate the spatial frequencies for the laser beam;

means for receiving the encoded laser beam from the grating and providing an output signal; and means for determining one or more phase differences between a phase of the output signal and a phase of a corresponding one of the frequencies of the input signal, wherein the phase difference corresponds to a position measurement of the grating.

20. The grating of claim 19, further comprising:

means for directing the laser beam from the modulating means to the grating; and means for providing the laser beam to the modulating means.

\* \* \* \* \*